G. T. HECKMANN.
ANTISKID DEVICE.
APPLICATION FILED NOV. 10, 1914.

1,160,890.

Patented Nov. 16, 1915.

WITNESSES

INVENTOR
George T. Heckmann
BY
ATTORNEYS

UNITED STATES PATENT OFFICE.

GEORGE T. HECKMANN, OF ST. LOUIS, MISSOURI.

ANTISKID DEVICE.

1,160,890.  Specification of Letters Patent.  Patented Nov. 16, 1915.

Application filed November 10, 1914. Serial No. 871,326.

*To all whom it may concern:*

Be it known that I, GEORGE T. HECKMANN, a citizen of the United States, and a resident of St. Louis, Missouri, have invented a new and Improved Antiskid Device, of which the following is a full, clear, and exact description.

My invention relates to anti-skid devices for tires, and particularly to the type involving the use of chains arranged to be secured transversely of a tire by clamp means engaging the spokes of the wheel.

Further objects of my invention are to provide a clamp for the purpose indicated, in which a clamp screw to tighten or loosen the jaws of the clamp is prevented from turning one clamp jaw relatively to another, whereby to facilitate the tightening and loosening of the clamp by the use of one hand only.

A further object of the invention is to so arrange the clamp elements that the clamp may be manipulated from the outside of the wheel; to so construct and arrange the parts of the clamp and chain connecting means that they will afford no undesirable projecting elements laterally of the wheel; to provide for the convenient detachment of the chain when desired, and secure fastening when in position, and to provide a connecting means for the chain which will permit the chain to be sustained by the clamp sufficiently loose on the tire and permit its movement on the tread.

The invention also has for its object to improve devices of the indicated character, in various particulars, to the end that strength may be obtained with light construction of parts, as well as economy of manufacture and convenience in applying and adjusting the device.

The invention will be more particularly explained in the specific description following.

Figure 1:
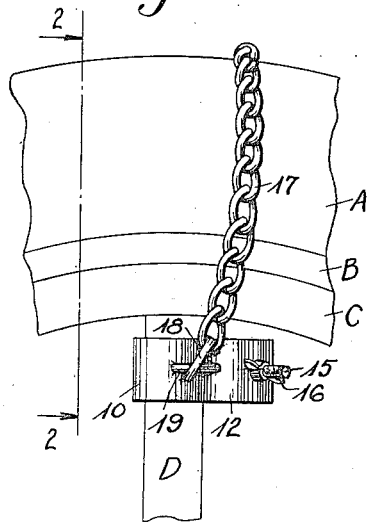
Figure 2:
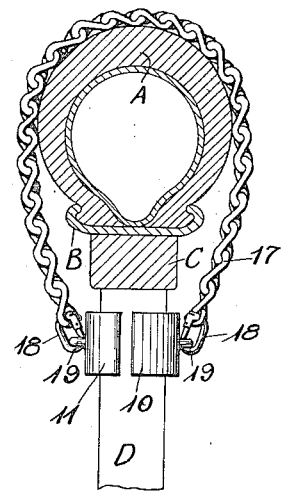
Figure 3:
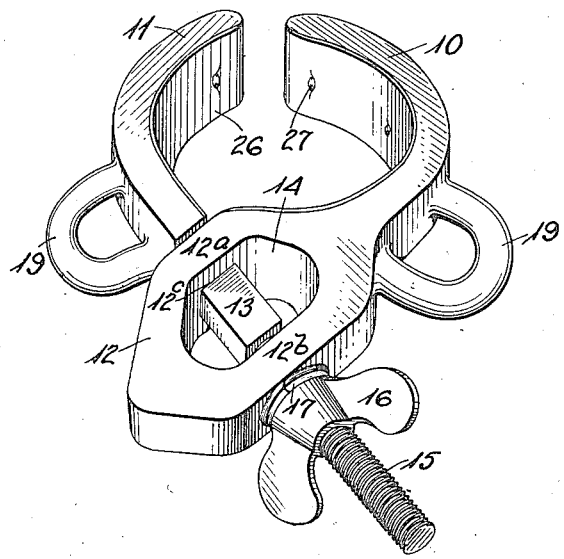
Figure 4:
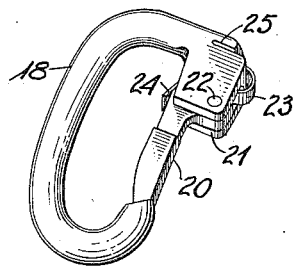

Reference is had to the accompanying drawings forming part of this specification, in which similar characters of reference indicate corresponding parts in all the views, and in which:

Figure 1 is a side view of an anti-skidding device embodying my invention, showing the same applied, the view being taken at the outside of the wheel parts; Fig. 2 is a transverse section on the line 2—2 Fig. 1. Fig. 3 is a perspective view of the improved clamp, and Fig. 4 is a perspective view of the improved snap link for detachably connecting the chain with the clamp.

The invention is applicable to any tire A, here conventionally shown in connection with a clencher rim B and felly C, a portion of a spoke B being also indicated.

The clamp of my improved device comprises jaws 10, 11, the one being formed with a rigid shank 12 which is enlarged to receive and afford guided movement for the reduced shank 13 of the opposite jaw 11. The enlarged shank is formed with a central opening to produce a light construction and presenting opposite spaced sides $12^a$, $12^b$. The rigid shank 13 of the opposite jaw is of reduced thickness, and is non-circular in cross section, and in the arm $12^a$ of the enlarged shank a non-circular transverse opening $12^c$ is formed receiving and conforming to the reduced non-circular portion of the other shank. The said reduced shank terminates in a threaded spindle 15 which extends through an opening in the arm $12^b$ of the enlarged shank in alinement with the non-circular opening. The threaded spindle extends through the clamp to the outer side, and it receives a nut 16, preferably a wing nut which bears against the back of the adjacent shank whereby to clamp the jaws on the spoke.

As will be apparent particularly from Figs. 1 and 3, the spindle 15 and its nut 16 are disposed at the outside of the wheel, the shanks of the jaws being disposed in crossed form, and the said threaded spindle of the one shank being disposed at the outside of the opposite shank. The result is that the nut 16 is accessible from the outside of the wheel, so that the jaws may be conveniently adjusted with one hand, the non-circular shank 13 and the corresponding opening $12^a$ preventing the turning of the jaw 11 relatively to the jaw 10.

To hold the nut 16 in adjusted position, a locking washer 17 may be employed beneath the nut. As the washer is of known form, it needs no more particular description.

Each jaw is adapted to receive an end of a chain 17 which extends transversely of the tire. The chain is detachably connected at its ends to the respective jaws through the medium of snap links 18, best shown in Fig. 4, which engage the end links of the chain, and engage loops 19 on the backs of the respective jaws. The links 18 are in the form of oblong loops, so that there may be a play of the links both radially and circumferentially of the wheel. Each snap link comprises separated ends terminating at one side of the loop, the opening between the ends being normally closed by a tongue 20 pivoted between cheeks 21 on the body of the link by a transverse pin 22. A plate spring 23 maintains the tongue in normal position, said spring ranging transversely beneath the tongue adjacent its pivot and presenting a free end 24 bearing against the tongue at the inner side in an outward direction. The spring is fastened at one end in a slot 25 in the body of the link at the base of the cheeks 21.

I have found the best results are obtained by permitting the chains to have movement on the tread of the tire in either direction circumferentially of the tire. By the described snap links taken in connection with the loops 19, which are so disposed on the clamp jaws that said eyes will range lengthwise of the jaws and transversely of the spoke to which the clamp is applied, the movement of the chain on the tread of the tire is permitted; at the same time the form of the link and the clamp presents no pronounced projections laterally of the wheel.

By the described construction it will be seen that the device may be applied and adjusted with convenience, and the form of the clamp permits of its being manufactured in comparatively light form, while possessing the necessary strength and durability.

Having thus described my invention, what I claim as new and desire to secure by Letters Patent, is:

1. In an anti-skid device having a transverse chain, a clamp to secure the ends of the chain to a spoke, said clamp having jaws provided with means whereby to connect with the chain and shanks on the jaws said shanks crossing each other, one shank having a portion non-circular in cross section having guided movement in a corresponding opening in the other shank and terminating in a threaded spindle, said spindle extending through the opposite shank to the outer side of the clamp, and a nut on said spindle whereby the jaws may be clamped on a spoke.

2. A clamp for anti-skid devices of the character described, said clamp having jaws adapted to embrace a wheel spoke, one jaw having a rigid shank formed with an enlargement having a non-circular opening at one side and a registering hole at the opposite side, the other jaw having a rigid shank formed with a reduced non-circular portion slidable in and corresponding with the non-circular opening of the first mentioned shank and terminating in a threaded spindle extending through the said registering opening of the other shank to the outer side of the clamp; and a nut on said threaded spindle engaging the back of the adjacent shank.

In testimony whereof I have signed my name to this specification in the presence of two subscribing witnesses.

GEORGE T. HECKMANN.

Witnesses:
HARRY A. WHEELER,
BROSE CHANNUSS.